(12) United States Patent
Tanaka

(10) Patent No.: US 6,435,971 B2
(45) Date of Patent: Aug. 20, 2002

(54) ELECTRIC POWER STEERING APPARATUS

(75) Inventor: Toshinori Tanaka, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/737,565

(22) Filed: Dec. 18, 2000

(30) Foreign Application Priority Data

Jun. 6, 2000 (JP) ........................... 2000-169226

(51) Int. Cl.$^7$ ............................................. F16D 27/00
(52) U.S. Cl. ........................... 464/29; 310/94; 180/443
(58) Field of Search ................. 464/29, 30; 192/56.41; 417/420; 310/94, 97; 180/443, 446

(56) References Cited

U.S. PATENT DOCUMENTS

| | | | | |
|---|---|---|---|---|
| 1,608,872 A | * | 11/1926 | Wallis | 310/97 X |
| 2,640,166 A | * | 5/1953 | Zozulin et al. | 310/94 |
| 2,725,493 A | * | 11/1955 | Mitchel et al. | 310/97 |
| 3,139,549 A | * | 6/1964 | Groth | 310/97 |
| 3,913,851 A | * | 10/1975 | Andersson | |
| 4,115,040 A | * | 9/1978 | Knorr | 464/29 X |
| 4,651,856 A | * | 3/1987 | Skrobisch | 464/29 |
| 4,700,436 A | * | 10/1987 | Morita | 24/303 |
| 5,204,621 A | * | 4/1993 | Hermann et al. | |
| 5,749,454 A | * | 5/1998 | Layne | 198/781.01 X |

FOREIGN PATENT DOCUMENTS

| | | |
|---|---|---|
| JP | 7-35248 | 6/1995 |
| JP | 9-84300 | 3/1997 |

* cited by examiner

*Primary Examiner*—Greg Binda
(74) *Attorney, Agent, or Firm*—Sughrue Mion, PLLC

(57) ABSTRACT

An electric power steering apparatus for supplying a steering assist torque from an electric motor to a steering mechanism including a torque limiter which comprises a case made of a magnetic material and secured to an output shaft of the electric motor, a boss made of a magnetic material concentrically rotatably arranged relative to the case and connected to a driven shaft, and a permanent magnet member disposed between the case and the boss for magnetically connecting therebetween. The permanent magnet member is annular and has an axially anisotropic magnetization of a negative temperature coefficient of residual magnetic flux density. The apparatus comprises a layer of an abrasion-resistant material provided between the permanent magnet member and at least one of the case and the boss and a cover for covering the outside of the case and the boss. At least one of the case and the boss comprises a guide portion for guiding and supporting at least one of an outer circumference surface and an inner circumference surface of the permanent magnet member that is annular as well as a seal portion for sealing at least one of the outer circumferential surface and the inner circumferential surface of the other of the case and the boss against the entry of any foreign matter.

8 Claims, 5 Drawing Sheets

ELECTRIC POWER STEERING APPARATUS

BACKGROUND OF THE INVENTION

This invention relates to an electric power steering apparatus and, more particularly, to an electric power steering apparatus for supplying a steering assist torque from an electric motor to a steering mechanism through a torque limiter.

The electric power steering apparatus is usually provided on the electric motor shaft side with a torque limiter for absorbing excessively large impact torque acting when an excessive torque is generated on the electric motor for generating a steering assisting torque on the steering mechanism or other steering assisting torque transmission mechanism.

FIG. 5 illustrates a torque limiter of a conventional electric power steering apparatus having a similar structure to that disclosed in Japanese Patent Laid-Open No. 9-84300 and FIG. 6 is an exploded view of the torque limiter shown in FIG. 5. In these figures, the torque limiter 2 comprises a case 4 fixed to an output shaft 3 of the electric motor (not shown), a cover 5 secured onto the case 4 by caulking, a boss 6 connected to a driven shaft (not shown) and rotatable relative to the case 4 and a friction plate 8 disposed between the cover 5 and the boss 6 through a spring member 7 and rotatable relative to the boss 6. The friction plate 8 is rotatable relative to the boss 6 but is arranged to rotate together with the case 4 by the interlocking rotation limiting portion (not shown) formed on the case 4. Also, the friction plate 8 is urged against the boss 6 by the action of the spring member 7. The cover 5 supports the urging force of the spring member 7 and is secured to the case 4 by the caulking of the inner circumferential edge portion.

During the ordinary operation, the steering assist torque from the output shaft 3 of the electric motor is transmitted to the driven shaft (not shown) through the case 4 and the boss 6 integral to the case 4 because of the frictional force generated between the friction plate 8 and the boss 6 and between the boss 6 and the case 4 due to the pressure from the spring member 7. When an excessive impact force acts against the electric motor side from the wheel side through the driven shaft, a slip generates between the friction plate 8 and the boss 6 and between the boss 6 and the case 4 of the torque limiter 2, permitting the boss 6 to rotate relative to the case 4 and the output shaft 3 to absorb the impact torque.

FIGS. 7 to 9 illustrate another conventional torque limiter 10. This torque limiter 10 comprises a case 11 fixed to an output shaft 3 of the electric motor (not shown), a boss 12 spline-engageable to the driven shaft (not shown) and concentrically rotatable relative to the case 11, and a ring member 13 disposed between an outer circumferential surface of the boss 12 and an inner wall surface of the case 11. The ring member 13 has a trapezoidal cross-sectional shape for example and comprises a projection portions 14 that abut to the inner wall surfaces of the inner wall surface 17 of the case 11 and leg portions 15 engaged with the groove 16 formed to extend in the circumferential direction of the boss 12.

During the ordinary operation, the steering assist torque from the output shaft 3 of the electric motor is transmitted to the boss 12 and to the driven shaft (not shown) through the case 11, the case inner wall surface 17 and through the ring member 13. When an excessive impact force acts against the electric motor side from the wheel side through the driven shaft, a slip generates between the boss 12 and the case 11 of the torque limiter 10, permitting the boss 12 to rotate relative to the case 4 and the output shaft 3 integral with the case 4 to absorb the impact torque, whereby the torque transmission mechanism such as plastic gears may be prevented from being destroyed.

As discussed above, the pressure member and the friction plate are employed in the torque limiter of the electric power steering apparatus shown in FIGS. 5 and 6, so that, when some kind of damages are generated in the torque transmitting portion, the friction factor of the surface of the friction member varies to significantly change the transmitted torque and degrade the initial desired performance, also resulting in disadvantages in the maintenance.

In the torque limiter of the electric power steering apparatus shown in FIGS. 7 and 8, in addition to the transmitted torque being significantly changed as discussed above, the function of protecting the resin gear at an elevated temperature can be easily degraded because the transmitted torque has no temperature coefficient because of its nature. This point will be described later in conjunction with FIG. 3. Although Japanese Utility Model Laid-Open No. 7-35248 discloses the use of the torque limiter composed of the pressure member and the friction plate disposed on the motor output shaft as an example of the torque limiter for generating a slip upon an excessive torque, this torque limiter is disadvantageous in that it is less stable in the transmitted torque because of a wide range of the friction coefficient.

Thus, in the conventional torque limiter of the electric power steering apparatus, the transmitted torque changes according to the lapse of time during the use and the stability is insufficient and, when the temperature changes, the transmitted torque does not decrease to the predetermined value particularly at an elevated temperature, resulting in a less sufficient reliability and in a failure to provide the maintenance-free feature. Also, while the torque limiter itself already has a simple structure, an electric power steering apparatus having an inexpensive torque limiter that has further improved durability and cost due to the present demands in the market is desired.

Accordingly, an object of the present invention is to provide an electric power steering apparatus having a torque limiter free from the above-discussed problems of the conventional torque limiter.

Another object of the present invention is to provide an electric power steering apparatus having an inexpensive torque limiter that can cope with the temperature change with a simple structure.

SUMMARY OF THE INVENTION

With the above object in view, the present invention resides in an electric power steering apparatus for supplying a steering assist torque from an electric motor to a steering mechanism through a torque limiter, the torque limiter comprising a case made of a magnetic material and secured to an output shaft of the electric motor, a boss made of a magnetic material concentrically rotatably arranged relative to the case and connected to a driven shaft, and a permanent magnet member disposed between the case and the boss for magnetically connecting therebetween.

The permanent magnet member may be an annular member having an axially anisotropic magnetization and having a negative temperature coefficient of residual magnetic flux density.

The case and the boss may be ferromagnetic magnetic material.

The electric power steering apparatus may further comprise a layer of an abrasion-resistant material provided between the permanent magnet member and at least one of the case and the boss.

At least one of the case and the boss may comprise a guide portion for guiding and supporting at least one of an outer circumference surface and an inner circumference surface of the permanent magnet member that is annular.

At least one of the case and the boss may comprise a seal portion for sealing at least one of the outer circumferential surface and the inner circumferential surface of the other of the case and the boss against the entry of any foreign matters.

The electric power steering apparatus may further comprise a cover for covering the outside of the case and the boss.

The guide portion of at least one the case and the boss may constitute a portion of a magnetic circuit for permitting the magnetic flux to pass therethrough.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
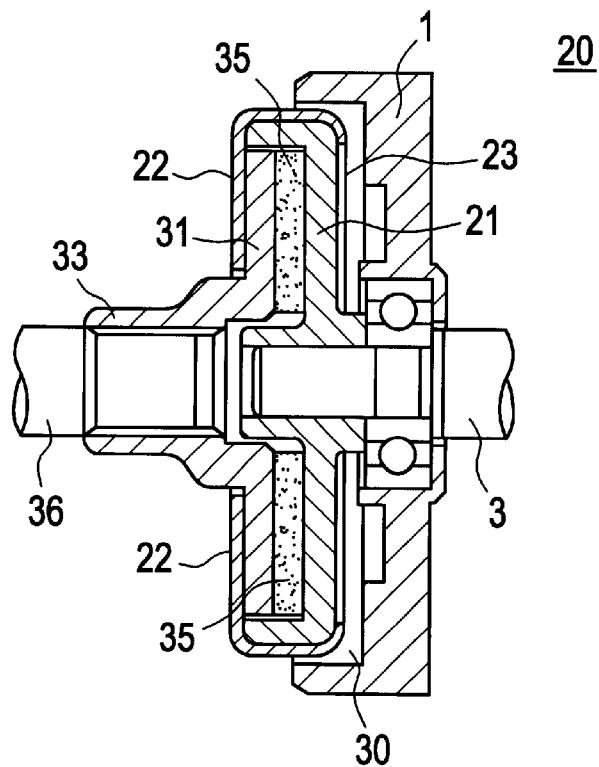
FIG. 1 is a sectional side view showing the torque limiter of the electric power steering apparatus of the present invention.
Figure 2:
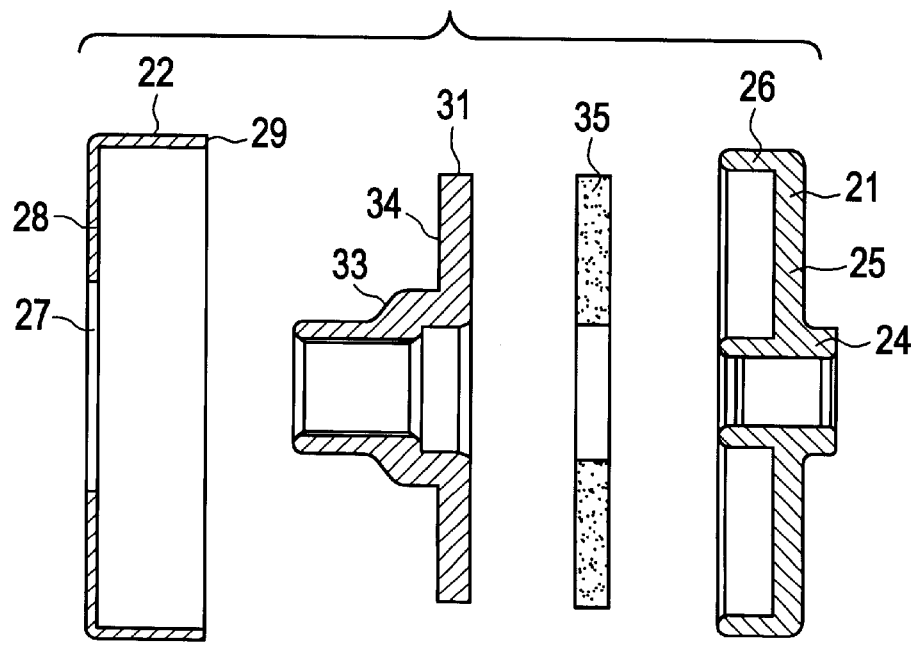
FIG. 2 is an exploded sectional side view showing the torque limiter of the electric power steering apparatus shown in FIG. 1.

FIG. 1 is a sectional side view showing the torque limiter of the electric power steering apparatus of the present invention, and FIG. 2 is an exploded sectional side view showing the torque limiter of the electric power steering apparatus shown in FIG. 1. As seen from FIGS. 1 and 2, the torque limiter 20 of the electric power steering apparatus of the present invention comprises a shallow dish-shaped case 21 fixed to an output shaft 3 of the electric motor 1 (only partly shown) and a cover 22 secured onto the case 21 by caulking to partially cover it. The case 21 and the cover 22 constitute a case assembly 23. As illustrated in FIG. 2, the case 21 comprises a circular disc portion 25 having a hub 24 that can fit to the output shaft 3 of the electric motor 1 and an annular flange 26 extending from the circumferential edge of the disc portion 25. The cover 22 has a circular opening 27 formed at its center and comprises a disc portion 28 abutting at its circumferential edge portion with the tip of the flange 26 of the case 21, an outer cylinder portion 16 annularly extending along the flange 26 of the case 21 from the circumferential edge of the disc portion 28 and a caulking portion 30 (FIG. 1) caulked to be bent to extend from the outer cylinder portion 16 along the disc portion 28 of the case 21.

Disposed within the case assembly 23 composed of the case 21 and the cover 22 is a boss 31 concentrically rotatable relative to the case assembly 23 and connected to a driven shaft 36 which is a part of a steering mechanism. The boss 31 comprises a hub 33 fitted at its one end over the hub 24 of the case 21 and extending at the other end through the opening 27 of the cover 22 to be connected to the driven shaft 36 and a disc portion 34 extending from the hub 33 along the disc portion 25 of the case 21. The case 21 and the boss 31 both are made of a magnetic material which may advantageously be made of a ferromagnetic material. The cover 22 does not have to be a magnetic material but it is desirable to make it with a magnetic material. Although each components are magnetically attracted to each other due to a permanent magnet which will be described later and form a stable assembly even when the cover 22 is not used, it is desirable to use the cover 22 because the stability is much more improved and the ingress of any foreign matters such as magnetic particles in particular can be prevented.

According to the present invention, a permanent magnet member 35 having a configuration of a disc with a central opening or a relatively thin ring is inserted between the disc portion 25 of the case 21 and the disc portion 34 of the boss 31. This permanent magnet member 35 is for magnetically coupling the case 21 and the boss 31. The permanent magnet member 35 has an axially anisotropic magnetization and having a negative temperature coefficient of residual magnetic flux density and it is desirable to make it from a ferrite magnet material, a neodymium magnet material or rare earth magnet material.

In the illustrated embodiment, the outer circumferential surface of the hub 24 of the case 21 and the inner circumferential surface of the flange 26 are positioned in the vicinity of the outer circumferential surface of the permanent magnet member 35 and guide it, thus serving as a guide portion for the permanent magnet member 35 to prevent undesirable movement such as chattering of the permanent magnet member 35. However, a guide portion may also be provided at at least one of the case 21 and the boss 31 for guiding and supporting at least one of the outer and the inner circumferential portions of the permanent magnet member 35.

Also in the illustrated embodiment, the flange 26 of the case 21 covers the outer circumferential surface of the disc portion 34 of the boss 31 and prevents the ingress of the foreign matters into inside of the torque limiter and particularly the magnetic attachment or the like of the magnetic particles to the permanent magnet 35. Similarly, at least one of the case 21 and the boss 31 may be provided with a seal portion for covering at least one of the outer and the inner circumferential surfaces of the other of the case 21 and the boss 31 against the ingress of foreign matter from the outside.

Figure 3:
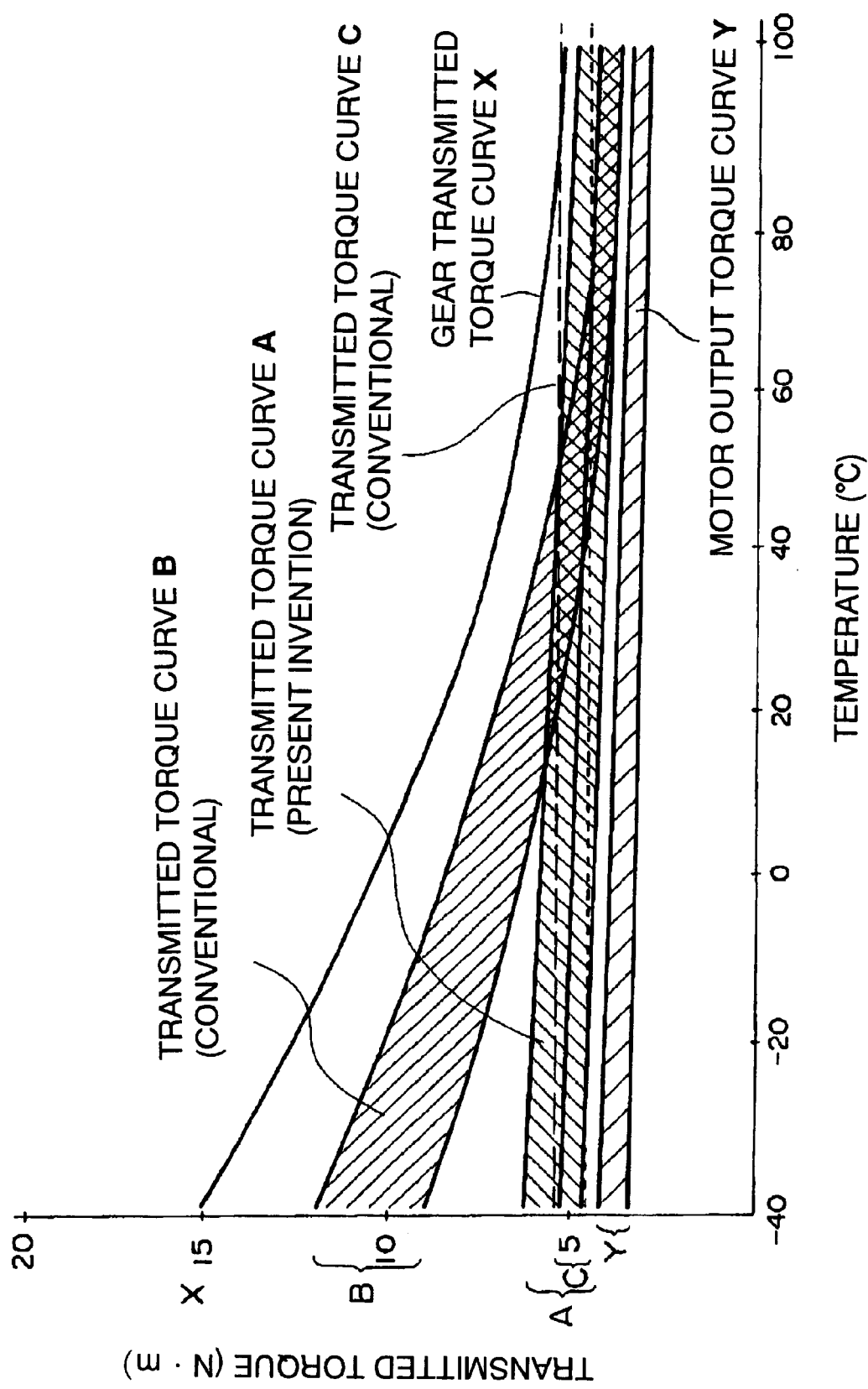
FIG. 3 is a graph showing the transmitted torque (N·m) with respect to temperature (°C.) by the transmitted torque curves A, B and C indicating the change in the maximum transmitted torque with respect to the temperature change of the torque limiter of the electric power steering apparatus as compared to that of the conventional design, a transmitted torque curve X of the steering gear as well as the output torque curve Y of the electric motor are also being depicted.
Figure 5:
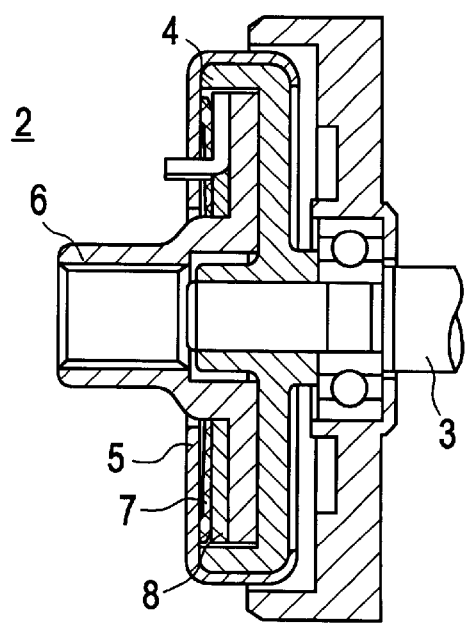
FIG. 5 is a sectional side view showing the torque limiter of the conventional electric power steering apparatus.
Figure 6:
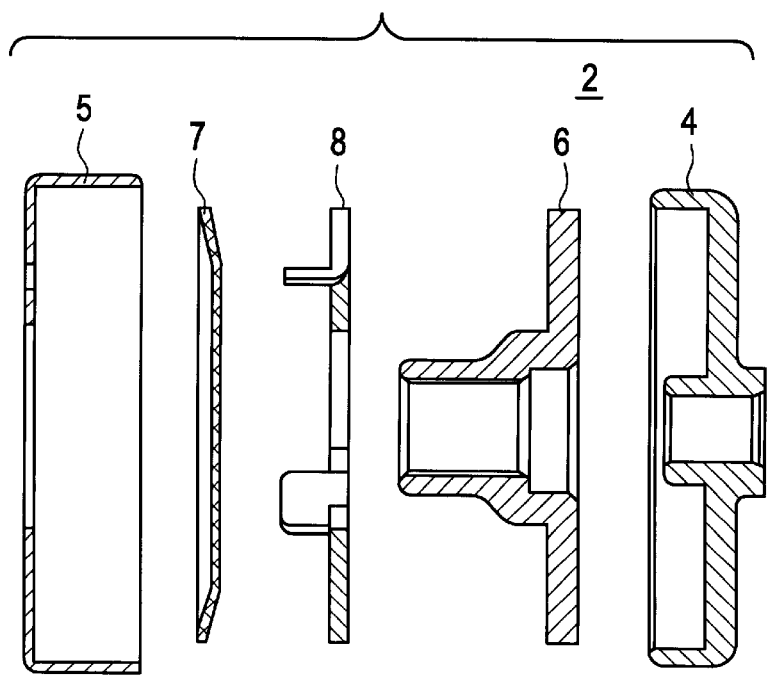
FIG. 6 is an exploded sectional side view showing the torque limiter of the conventional electric power steering apparatus.

FIG. 3 is a graph showing the change in the maximum transmitted torque with respect to the temperature change of the torque limiter employing the permanent magnet member 35 according to the present invention by the transmitted torque curve A, the axis of abscissa representing the temperature (°C.) and the axis of ordinate representing the transmitted torque (N·m). This graph also shows a transmitted torque curve B of a conventional torque limiter shown in FIGS. 5 to 6 as well as a transmitted torque curve C of a conventional torque limiter shown in FIGS. 7 to 9 so that they can be compared the transmitted torque curve A of the torque limiter of the present invention. A transmitted torque curve X indicating the transmitted torque of the portion having the smallest strength of the steering gear as well as the output torque curve Y indicating the output torque of the electric motor of the electric power steering apparatus are also indicated. The width or the thickness of these curves represents the deviation of the performance as the products.

The functions required as the torque limiter is to ensure that while it transmits the output torque from the electric motor even when the temperature condition has been changed, it does not transmit the torque exceeding the steering gear strength, so that the transmitted torque curve of the torque limiter must always be positioned between the transmitted torque curve X indicative of the steering gear strength and the output torque curve Y indicative of the output from the electric motor. As apparent from the curve B, while the transmitted torque of the conventional torque limiter shown in FIGS. 5 and 6 decreases as the temperature increases, it is always positioned between the curve X indicative of the gear strength and the output torque curve Y of the electric motor. However, since the range between the curves X and Y is very narrow at an elevated temperature of the order of 90° C., for example, when the transmitted torque curve B is placed, an unnecessarily large torque as compared to the output torque from the electric motor is transmitted at a lower temperature.

Figure 7:
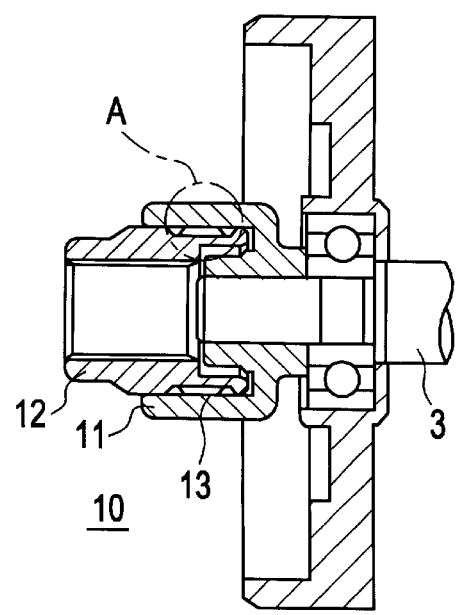
FIG. 7 is a sectional side view showing the torque limiter of another conventional electric power steering apparatus.
Figure 8:
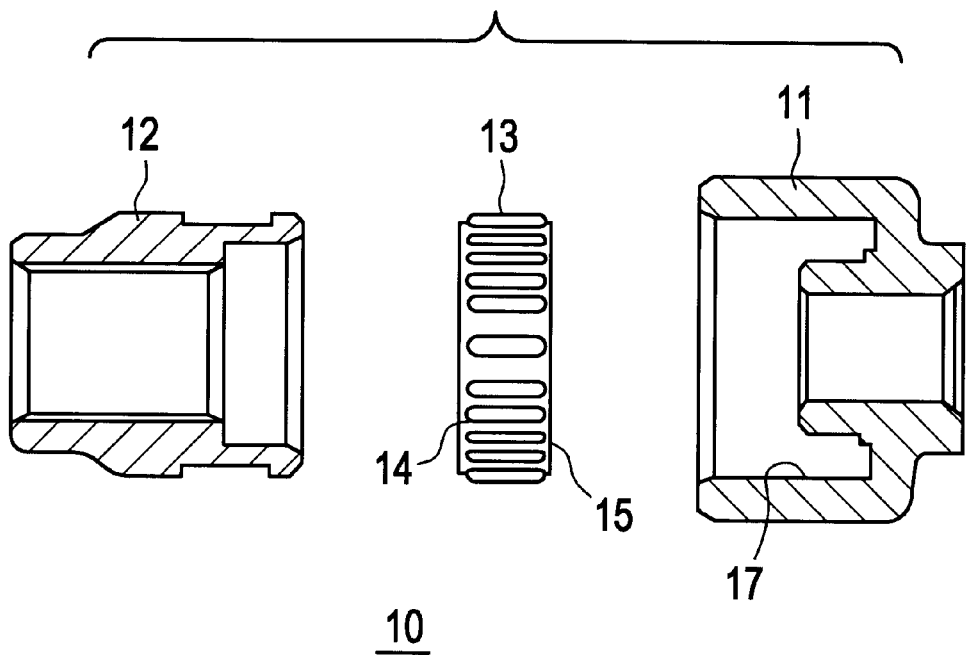
FIG. 8 is an exploded sectional side view showing the torque limiter of the conventional electric power steering apparatus shown in FIG. 7.
Figure 9:
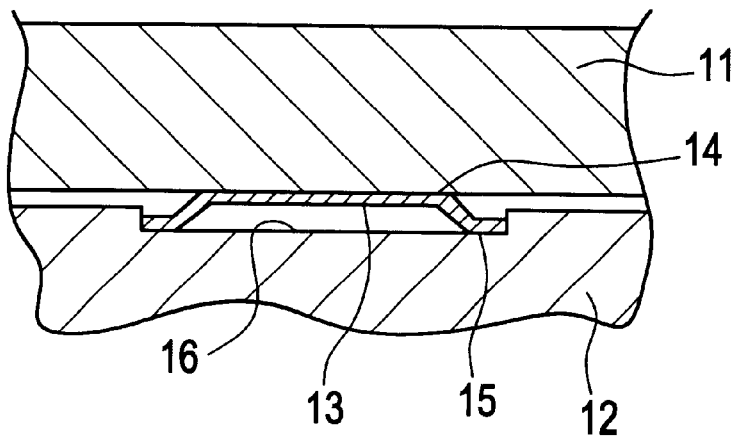
FIG. 9 is a sectional side view showing the details of the torque limiter of the conventional electric power steering apparatus shown in FIG. 7.

The conventional torque limiter shown in FIGS. 7 to 9 transmits a substantially constant torque irrespective of the temperature change, so that the transmitted torque curve C is substantially parallel to the axis of abscissa. Therefore, it is difficult to place the transmitted torque curve C that has a relatively large width due to the deviation in each product within a range between the transmitted torque curve X of a relatively low value at a high temperature and the motor output torque curve Y larger, although slightly, at the lower temperature than at the higher temperature, whereby the safety factor (safety allowance) becomes extremely small at the both end regions of the temperature range.

Since the transmitted torque curve A of the torque limiter of the present invention exhibits a tendency of decreasing as the temperature rise substantially in parallel to the output torque curve Y and since the deviation of performance and the aging change of the permanent magnet member 35 and the torque transmitting surface are small and the width of the curves are small, relatively large safety factor (safety allowance) can be obtained at the opposite ends of the operating temperature range.

In the torque limiter for the electric power steering apparatus as above discussed, the permanent magnet member 35 having a predetermined magnetic attraction force is used, so that the structure is very simple and the manufacture or assembly is easy. Also, even when the frictional surface of the transmission torque has been worn, the torque transmission is achieved not by the friction force but by the magnetic attractive force, so that the deviation of the transmitted torque is small. Also, since the temperature coefficient of the magnetic attractive force of the permanent magnet is substantially equal to the temperature coefficient of the motor output torque, the resin gears can be protected against the excessively large impact from the outside. Further, the magnetic attractive force is not provided by an electromagnetic clutch which causes a power loss leading to a lower energy efficiency, but is instead provided by the permanent magnet which does not generate the power loss of the electromagnetic clutch that results in high energy loss.

Figure 4:
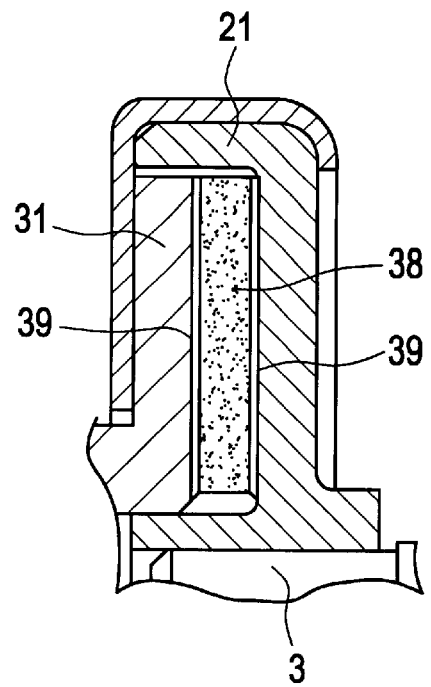
FIG. 4 is a sectional side view showing the torque limiter of the electric power steering apparatus of another embodiment of the present invention.

FIG. 4 illustrates another embodiment of the present invention. This torque limiter has a permanent magnet member 38 which has a lining or film 39 of a magnetic or magnetically permeable material coating a ring-shaped flat surface. A thin sheet material may be used instead of the film 39. In other respects, the torque limiter is similar to that previously discussed. With this structure, the frictional force of the torque-transmitting surface becomes stable, thus improving the operational reliability and the durability.

As has been described, according to the present invention, the electric power steering apparatus for supplying a steering assist torque from an electric motor to a steering mechanism includes a torque limiter 20 which comprises a case 21 made of a magnetic material and secured to an output shaft 3 of the electric motor, a boss 31 made of a magnetic material concentrically rotatably arranged relative to the case 21 and connected to a driven shaft (not shown), and a permanent magnet member 35 disposed between the case 21 and the boss 31 for magnetically connecting therebetween. Therefore, the structure is very simple and the manufacture or assembly is easy, the deviation of the transmitted torque is small, and the resin gears can be protected against the excessively large impact from the outside.

The permanent magnet member 35 may be an annular member having an axially anisotropic magnetization and having a negative temperature coefficient of residual magnetic flux density, so that the resin gears can be protected against the excessively large impact from the outside.

The case 21 and the boss 31 may be ferromagnetic magnetic material, so that they may function as a part of magnetic circuit thus improving the magnetic attractive force.

The electric power steering apparatus may further comprise a layer 39 of an abrasion-resistant material provided between the permanent magnet member 38 and at least one of the case 21 and the boss 31, so that the frictional force of the torque transmitting surface becomes stable, thus improving the operational reliability and the durability.

At least one of the case 21 and the boss 31 may comprise a guide portion for guiding and supporting at least one of an outer circumference surface and an inner circumference surface of the permanent magnet member 35 that is annular, so that a guide portion for the permanent magnet member 35 is provided to prevent undesirable movement such as chattering of the permanent magnet member 35.

At least one of the case 21 and the boss 31 may comprise a seal portion for sealing at least one of the outer circumferential surface and the inner circumferential surface of the other of the case 21 and the boss 31 against the entry of any foreign matters, so that the ingress of the foreign matters into inside of the torque limiter and particularly the magnetical attachment or the like of the magnetic particles to the permanent magnet 35 can be prevented.

The electric power steering apparatus may further comprise a cover 22 for covering the outside of the case 21 and the boss 31, so that the ingress of any foreign matters such as magnetic particles or the like into the inside of the torque limiter can be prevented.

The guide portion of at least one the case 21 and the boss 31 may constitute a portion of a magnetic circuit for permitting the magnetic flux to pass therethrough, so that the magnetic flux can be efficiently utilized.

What is claimed is:

1. An electric power steering apparatus for supplying a steering assist torque from an electric motor to a steering mechanism through a torque limiter, said torque limiter comprising:

a case made of a magnetic material and secured to an output shaft of said electric motor;

a boss made of a magnetic materials concentrically rotatably arranged relative to said case and connected to a driven shaft; and a single permanent magnet member disposed between said case and said boss for magnetically connecting therebetween, wherein a radius of said permanent magnet member is substantially greater than a thickness thereof, and said boss has a diameter substantially similar to a diameter of said permanent magnet member.

2. An electric power steering apparatus as claimed in claim 1, wherein said permanent magnet member is an annular member having an axially anisotropic magnetization and having a negative temperature coefficient of residual magnetic flux density.

3. An electric power steering apparatus as claimed in claim 1, wherein said case and said boss are ferromagnetic magnetic material.

4. An electric power steering apparatus as claimed in claim 1, further comprising a layer of an abrasion-resistant material provided between said permanent magnet member and at least one of said case and said boss.

5. An electric power steering apparatus as claimed in claim 1, at least one of said case and said boss comprises a guide portion for guiding and supporting at least one of an outer circumference surface and an inner circumference surface of said permanent magnet member that is annular.

6. An electric power steering apparatus as claimed in claim 1, at least one of said case and said bass comprises a seal portion for sealing at least one of the outer circumferential surface and the inner circumferential surface of the other of said case and said boss against the entry of any foreign matter.

7. An electric power steering apparatus as claimed in claim 6, wherein said guide portion of at least one said case and said boss constitutes a portion of a magnetic circuit for permitting a magnetic flux to pass therethrough.

8. An electric power steering apparatus as claimed in claim 1, further comprising a cover for covering the outside of said case and said boss.

* * * * *